(12) United States Patent
Lucca et al.

(10) Patent No.: US 10,905,049 B2
(45) Date of Patent: Feb. 2, 2021

(54) STRUCTURAL SET FOR HEADER ASSEMBLY AND HARVESTING MACHINE

(71) Applicant: CNH Industrial America LLC, New Holland, PA (US)

(72) Inventors: João Augusto Marcolin Lucca, São Pedro (BR); Andre Seki, Sorocaba (BR)

(73) Assignee: CNH Industrial America LLC, New Holland, PA (US)

( * ) Notice: Subject to any disclaimer, the term of this patent is extended or adjusted under 35 U.S.C. 154(b) by 145 days.

(21) Appl. No.: 15/988,424

(22) Filed: May 24, 2018

(65) Prior Publication Data
US 2018/0352744 A1 Dec. 13, 2018

(30) Foreign Application Priority Data
May 24, 2017 (BR) .......................... 1020170108570

(51) Int. Cl.
*A01D 67/00* (2006.01)
*A01D 45/10* (2006.01)
*A01D 75/28* (2006.01)

(52) U.S. Cl.
CPC ............. *A01D 67/00* (2013.01); *A01D 45/10* (2013.01); *A01D 75/287* (2013.01)

(58) Field of Classification Search
CPC ...... A01D 67/00; A01D 75/287; A01D 45/10; A01D 75/285; A01D 67/005; A01D 47/00; A01D 45/003; A01D 41/145; A01D 41/141; A01D 41/14; A01D 41/06; A01B 59/064; A01B 63/004
See application file for complete search history.

(56) References Cited

U.S. PATENT DOCUMENTS

| | | | |
|---|---|---|---|
| 2,513,111 A | 5/1950 | Schiller | |
| 2,748,552 A | 6/1956 | Pool et al. | |
| 2,835,095 A | 5/1958 | Self | |
| 3,324,636 A | 6/1967 | Houn | |
| 3,460,323 A | 8/1969 | Schnaidt | |
| 3,731,470 A * | 5/1973 | Cornish | A01D 75/285 56/10.4 |
| 4,176,727 A * | 12/1979 | Perin | A01B 59/062 172/125 |

(Continued)

FOREIGN PATENT DOCUMENTS

| | | |
|---|---|---|
| BR | 102015015922-6 A2 | 1/2017 |
| WO | 2014/026255 A1 | 2/2014 |
| WO | 2014127005 A1 | 8/2014 |

*Primary Examiner* — Arpad Fabian-Kovacs
(74) *Attorney, Agent, or Firm* — Peter Zacharias; Patrick Sheldrake

(57) ABSTRACT

A structural set for assembling a header intended for harvesters is capable of compensation of the lateral movement of the header according to the ground conditions of the planting rows being harvested. More particularly, a structural set for assembling a header in an agricultural machine comprising a girder with a central beam interconnected to at least two structural columns, the central beam being provided with a pivoting point for engaging and fastening a bracket, and at least one return element of the bracket for returning the bracket in a substantially horizontal position when at rest.

17 Claims, 5 Drawing Sheets

(56) References Cited

U.S. PATENT DOCUMENTS

| | | | | |
|---|---|---|---|---|
| 4,253,295 A * | 3/1981 | Knepper | A01D 41/16 | 56/15.6 |
| 4,266,391 A * | 5/1981 | McDuffie | A01D 41/16 | 56/14.5 |
| 4,266,392 A * | 5/1981 | Knepper | A01D 41/14 | 56/14.5 |
| 4,266,395 A * | 5/1981 | Basham | A01D 75/287 | 56/16.2 |
| 4,527,381 A * | 7/1985 | Mann | A01D 67/00 | 56/16.2 |
| 4,641,490 A * | 2/1987 | Wynn | A01D 41/145 | 56/10.2 E |
| 4,733,523 A * | 3/1988 | Dedeyne | A01D 75/287 | 56/10.2 E |
| 4,776,153 A * | 10/1988 | DePauw | A01D 41/145 | 56/10.2 E |
| 5,157,905 A * | 10/1992 | Talbot | A01D 41/14 | 56/15.9 |
| 5,464,371 A * | 11/1995 | Honey | A01D 41/14 | 460/20 |
| 5,473,872 A * | 12/1995 | Fox | A01B 71/06 | 180/53.1 |
| 5,799,483 A * | 9/1998 | Voss | A01D 75/287 | 460/119 |
| 5,918,448 A * | 7/1999 | Wheeler | A01D 75/287 | 56/10.2 E |
| 5,927,054 A * | 7/1999 | Chamberlain | A01D 45/021 | 56/10.2 E |
| 6,116,008 A * | 9/2000 | Digman | A01D 41/16 | 56/15.8 |
| 6,675,568 B2 * | 1/2004 | Patterson | A01D 41/14 | 56/208 |
| 6,813,873 B2 * | 11/2004 | Allworden | A01D 41/141 | 56/10.2 E |
| 7,043,891 B2 | 5/2006 | Rickert et al. | | |
| 7,073,316 B2 | 7/2006 | Resing et al. | | |
| 7,191,582 B2 * | 3/2007 | Bomleny | A01D 41/141 | 56/10.2 E |
| 7,207,164 B2 * | 4/2007 | Bomleny | A01D 41/141 | 56/10.2 E |
| 7,222,475 B2 * | 5/2007 | Bomleny | A01D 41/141 | 56/10.2 E |
| 7,661,251 B1 * | 2/2010 | Sloan | A01D 41/141 | 56/10.2 E |
| 7,918,076 B2 * | 4/2011 | Talbot | A01D 41/14 | 56/208 |
| 8,079,204 B2 * | 12/2011 | Coers | A01D 41/14 | 56/15.8 |
| 8,745,964 B2 * | 6/2014 | Patterson | A01D 43/04 | 56/15.8 |
| 8,769,920 B2 * | 7/2014 | Patterson | A01D 43/06 | 56/228 |
| 9,192,099 B2 * | 11/2015 | Rittershofer | A01D 41/12 | |
| 9,309,057 B2 * | 4/2016 | Juelke | A01D 41/16 | |
| 9,717,181 B2 * | 8/2017 | Boyd, III | A01D 41/16 | |
| 9,730,375 B2 * | 8/2017 | De Coninck | A01B 63/008 | |
| 9,736,976 B2 * | 8/2017 | Figger | A01B 59/006 | |
| 9,867,324 B2 * | 1/2018 | De Coninck | A01B 63/004 | |
| 9,968,034 B2 * | 5/2018 | De Lathauwer | A01D 41/06 | |
| 10,278,330 B2 * | 5/2019 | Silver | A01D 41/06 | |
| 10,405,474 B2 * | 9/2019 | Brimeyer | A01D 41/16 | |
| 10,426,089 B2 * | 10/2019 | Matousek | A01F 12/10 | |
| 2002/0005033 A1 * | 1/2002 | Uhlending | A01D 75/287 | 56/10.2 R |
| 2007/0214760 A1 * | 9/2007 | Bomleny | A01D 41/141 | 56/10.2 E |
| 2008/0161077 A1 * | 7/2008 | Honey | A01D 41/16 | 460/106 |
| 2011/0232246 A1 | 9/2011 | Muething et al. | | |
| 2014/0174048 A1 | 6/2014 | Lawson et al. | | |
| 2014/0215992 A1 * | 8/2014 | Schraeder | A01D 41/145 | 56/14.7 |
| 2015/0271999 A1 * | 10/2015 | Enns | G05B 15/02 | 700/275 |
| 2015/0359177 A1 | 12/2015 | Richard et al. | | |
| 2016/0150716 A1 * | 6/2016 | De Coninck | A01B 63/008 | 56/153 |
| 2016/0183461 A1 * | 6/2016 | Neudorf | A01D 41/14 | 56/158 |
| 2016/0278276 A1 * | 9/2016 | De Coninck | A01B 63/004 | |
| 2016/0295796 A1 * | 10/2016 | Fischer | A01D 75/287 | |
| 2016/0302357 A1 * | 10/2016 | Tippery | A01B 59/061 | |
| 2017/0013778 A1 * | 1/2017 | Borry | A01D 41/145 | |
| 2017/0280626 A1 * | 10/2017 | Bertino | A01D 34/416 | |
| 2018/0098496 A1 * | 4/2018 | Silver | A01D 41/06 | |
| 2018/0338423 A1 * | 11/2018 | Lucca | A01D 45/10 | |
| 2019/0029175 A1 * | 1/2019 | Talbot | A01D 41/145 | |
| 2019/0230857 A1 * | 8/2019 | Thomson | A01D 41/145 | |

* cited by examiner

STRUCTURAL SET FOR HEADER ASSEMBLY AND HARVESTING MACHINE

CROSS REFERENCE TO RELATED APPLICATION

This application claims priority to Brazilian Application No. 1020170108570 filed May 24, 2017, the contents of which are incorporated herein by reference.

FIELD OF THE INVENTION

The present invention refers to a structural set for compensating the lateral movement of a header for agricultural machines, such as sugarcane harvesters.

The present invention further refers to a harvesting machine comprising the structural set for header assembly.

BACKGROUND OF THE INVENTION

According to the state of the art, and as it should be known to those skilled in the art, numerous models of agricultural machines and apparatuses are known to promote increased productivity in the harvesting of various types of plant crops, such as machines for harvesting grains in general, forage machines and machines for harvesting tall and stem plants, such as sugarcane harvesters.

It is known that grain harvesting machines, also known as grain harvesters or combine harvesters, have a configuration that allows harvesting different types of grains, and a header is attached to the front portion of the machine whose characteristics depend on the type of crop to be harvested, such as wheat, soybeans, corn, rice, etc.

In turn, forage machines are agricultural machines designed to harvest and grind a given plant crop to obtain forage, for example hay.

Particularly in relation to tall stem plants, such as sugarcane, energy cane and sweet sorghum, harvesting machines are designed and developed to promote the harvesting of this specific type of crop, this is why their intrinsic characteristics require specific conditions for their safe and proper processing, from cutting to transfer to overboard baskets and carts.

Therefore, the sugarcane and/or sweet sorghum harvesting machine generally has a fixed opening for receiving and harvesting the planting rows, which are generally spaced at relatively fixed and predetermined distances of 0.9 m or of 1.5 m, or also machines designed to collect two simultaneous rows within these spacings. Optionally, the harvesting machine of this type of plant crop can also have a variable opening, which can optionally harvest one or two plantings rows spaced 0.9 m or 1.5 m apart, or planting rows with alternating spacing of 0.9 m and 1.5 m. A solution proposed for a sugarcane harvester having the possibility of adjusting the opening to harvest crops having different spacings between the planting rows is disclosed, for example, in WO2014/026255, which is incorporated herein by reference.

The cultivation of sugarcane and sweet sorghum goes through a great evolution, both in terms of the development of new varieties of plants, and in terms of different planting configurations, always with the aim of increasing productivity, both in relation to quantity of tons harvested per hectare and in relation to the quantity of alcohol and/or sugar produced per ton harvested. Furthermore, applications of these plant crops are also known for the generation of energy from their biomass, where, unlike the production of alcohol and sugar, not only the part of the plant stem is used, but also the foliage and, possibly, the inflorescence. Hence, sugarcane varieties destined to the generation of energy, commonly denominated energy cane, are also being developed to increase the amount of fibers and reduce the amount of concentrated sucrose in the plant.

One of the main problems observed in sugarcane and sweet sorghum plantations is that harvesting machines are restricted to in-line harvesting, that is, they can only harvest the crop if it is planted in established planting rows, such as rows of planting spaced 0.9 m or 1.5 m, or rows spaced alternately by 0.9 m and 1.5 m. In the case of plantations intended to obtain biomass, planting in rows is not necessary, that is, planting can be done randomly and, for this reason, conventional sugarcane and sorghum harvesting machines are not able to promote the harvest of this material.

One option, in the case of harvesting for biomass generation, would be the replacement of sugarcane and sweet sorghum harvesters by forage machines. However, forage machine do not prove efficient either for harvesting tall stem plants, such as sugarcane and sweet sorghum, since the header intended for forage harvesting, such as those provided by Kemper, from Münster, Germany, do not provide a good performance for harvesting this type of plants, because they exhibit great wear, they leave a great amount of biomass in the ground and they are not efficient in feeding the plants to the machine.

Another drawback observed in sugarcane and/or sweet sorghum harvesting machines is the fact that the front elements, such as row dividers, knock-down rollers, base cutting discs and lift rollers, are fastened to the chassis itself of the harvesting machine. As appreciated by those skilled in the art, these front elements are those that are most prone to wear, because they are precisely those that are in front line in contact with the soil and the plant culture, besides absorbing impacts. Thus, if any of these front elements are damaged during harvesting and need to be repaired or replaced, the harvesting machine needs to be picked up for proper maintenance and, as a result, the harvesting will be interrupted until the machine is either returned from maintenance or replaced by another machine.

In order to attempt to overcome some of the drawbacks above, documents US 2014/0174048, by CNH America LLC, which is also to be incorporated herein as a reference, discloses a biomass harvesting system consisting of a sugarcane harvester whose basic front elements have been removed to allow the installation of an independent header in front of a conveyor roller set. The header being, for instance, a forage header for harvesting a plant crop, such as sugarcane and/or sweet sorghum, which was planted without a specific planting row pattern. In this sense, the machine disclosed in this document allows a greater variability for harvesting a planted plant crop with no regular planting rows or, in other words, allows harvesting independent of planting rows or lines.

Document BR 10 2015 015922 6, by CNH Industrial Latin America Ltda., discloses a sugarcane harvesting header and the like which can be coupled to the front portion of a harvesting machine, such as the above-mentioned harvester described in document US 2014/0174048, and thereby providing greater flexibility to harvest crops planted with different spacings, being able to change only the header, and not necessarily the whole machine. Moreover, if any of the front elements of the header is damaged during use, it is not necessary to stop the machine, but only change the header.

In addition, this flexibility in adapting the harvester also eliminates the need to stop the entire machine in case of any damage to one of the front elements of the header and, therefore, it is enough to simply replace the header.

In spite of being highly functional and solving a number of problems revealed by sugar cane harvesters known in the art and discussed above, in practice, it was observed that such agricultural equipment and machines could be improved and enhanced, particularly with regard to the proper positioning of the header in relation to the ground, in order to obtain the cut of the plant closest to the ground and, therefore, to ensure a more efficient harvest.

In particular, on headers designed to harvest two planting rows simultaneously, there is a risk of material loss, depending on ground conditions, due to the cutting of the plant which ends up being a waste of harvested material, since a useful part of the plant ends up remaining in the ground.

More specifically, it is known that the lands where the planting rows are located, are not flat and usually have unevenness between the planting rows, since there is a row spacing that can vary between 0.90 m and 1.5 m, or more, depending on the planting configuration. In this sense, since the headers for harvesting two rows are wide enough to accommodate these spacings, it is quite common that one side of the header cuts one planting row adequately and close to the ground, while the other side is higher, and cuts above the ground, thus, causing loss of harvested matter.

In this regard, picking machines known in the state of the art are incapable of promoting lateral compensation of the sides of the header, that is, of the base cutting discs and the row dividers.

As will be appreciated by those skilled in the art, although the harvesting machines currently available and known in the market disclose some adjustments, these are limited and insufficient to compensate for any unevenness between planting rows being harvested simultaneously.

SUMMARY OF THE INVENTION

Thus, based on the above, a structural set for assembling a header intended for harvesters, is comprised of technical, constructive and functional characteristics that provide due compensation of lateral movement of the header according to the ground conditions of the planting rows being harvested.

The present invention provides a structural set for assembling the structural header in a tall stalk plant harvesting machine, particularly for a header capable of conducting the simultaneous harvesting of two planting rows.

The present invention also provides a structural set for assembling a header in a tall stalk plant harvesting machine able to compensate for the unevenness of the ground, especially the unevenness between the planting rows.

Furthermore, the present invention provides a harvesting machine preferably intended for sugarcane and/or sweet sorghum harvest, and comprising the present structural set for header assembly and, thereby, obtain most efficient agricultural machines having a high productive capacity.

The invention is comprised of a structural set for assembling the header in an agricultural machine, of the tall stalk plant harvester type, the structural set comprising a girder consisting of a central beam which connects to the at least two structural columns. The central beam of the structural set further comprises a pivoting point for embedding and fastening a support, the structural set further comprising at least one return member of the support for repositioning it in a substantially horizontal position when at rest. Optionally, the structural assembly has two return elements for repositioning the support.

According to an embodiment of the present invention, the return element is, on one side, fastened to the support and, on the other side, fastened to the central beam of the structural set. Alternatively, the return element is, on one side, fastened to the support and, on the other side, fastened to at least one of the structural columns.

In yet another possible embodiment of the invention, the return elements may be of the spring type, shock absorbers and hydraulic and/or electrical mechanisms. According to a possible embodiment of the present invention, the return elements are helical springs fastened within the support and anchored on the central beam of the girder. Alternatively, the return elements are helical springs fastened to the outer surface of the support and are anchored to the support columns of the girder.

In addition, in accordance with a further embodiment of the present invention, the compensation of lateral movement of the header comprises the partial rotation of the support at an angle ($\alpha$) of up to about 15°. According to a particular embodiment, such angle ($\alpha$) may be up to about 5°.

According to another embodiment of the present invention, the support of the structural set comprises a rail for engaging the upper portion of the header structure. Particularly in order to increase the fastening level, object of the present invention, fastening pins or screws are provided for locking the header structure next to the support.

In addition, according to an alternative embodiment of the present invention, the header structure is locked through a configuration comprising at least one guide pin disposed on at least one of the support columns, which passes through a guide groove provided in the back plate of the header structure. Optionally, the two support columns of the girder comprise guide pins that pass through guide grooves disposed on the back plate of the header structure.

A further embodiment of the present invention comprises arranging sensors or auxiliary wheels in the header structure to conduct the ground mapping of terrain unevenness between the planting rows. In particular, these sensors or auxiliary wheels are arranged in the skids of the row dividers mounted on the header.

The present invention further relates to a harvesting machine of the type intended for harvesting tall stalk plants, comprising a chassis mounted on conveyor belts or wheels, a drive motor, a cabin for operation and control, primary cleaning extractor systems and a billet elevator, the machine being designed to comprise the structural set for the assembly of the cutting header.

According to an embodiment of the present invention, the harvesting machine is intended for cutting and harvesting sugarcane and/or sweet sorghum.

BRIEF DESCRIPTION OF THE DRAWINGS

The characteristics, advantages and technical effects of the present invention, as set forth above, will be better and more suitably understood by one skilled in the art from the following detailed description, taken by way of example, and not limiting, of embodiments, and with reference to the accompanying schematic drawings, wherein.

DETAILED DESCRIPTION OF THE INVENTION

Figure 1:
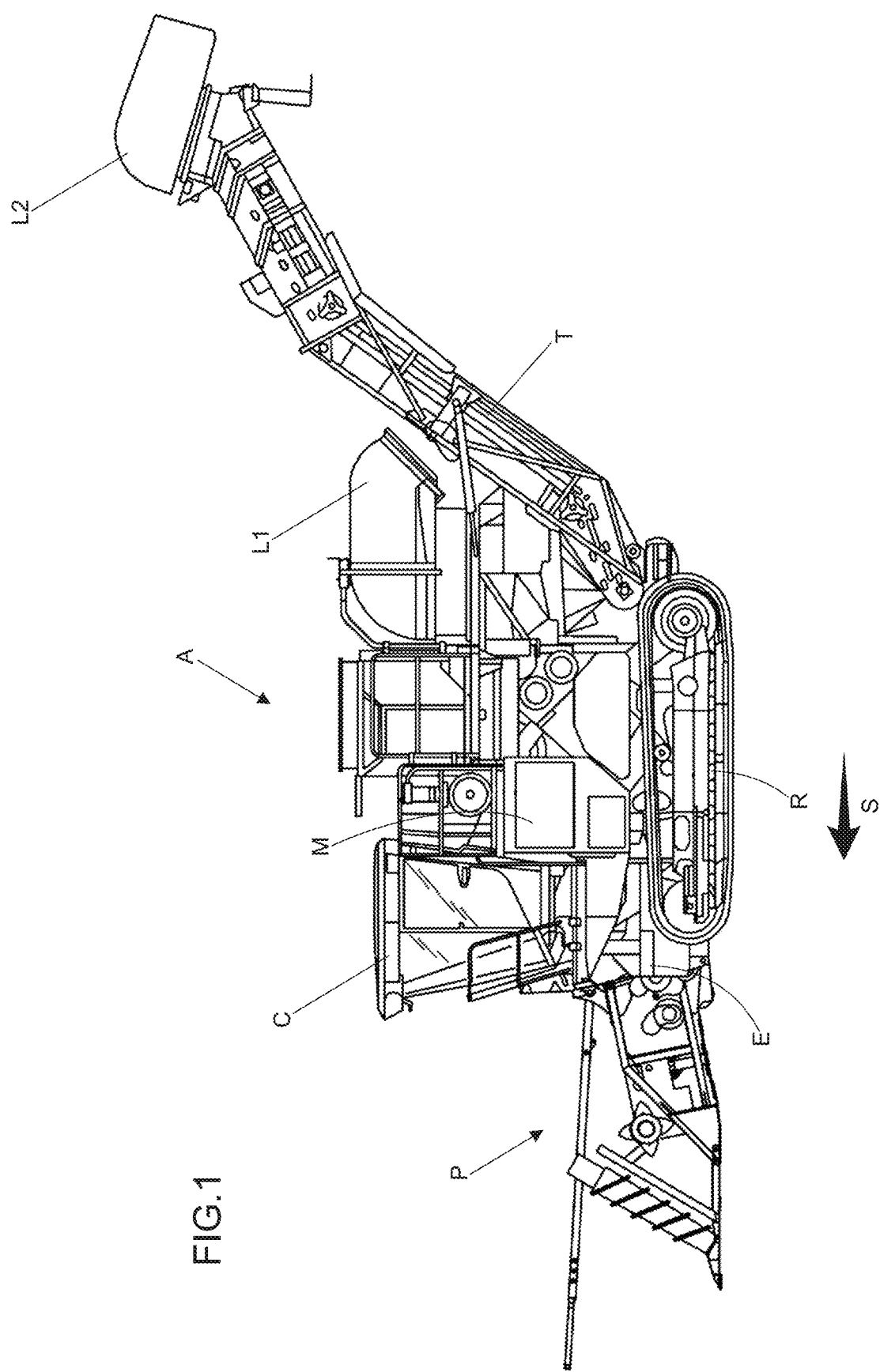
FIG. 1 is a schematic side view of a sugarcane harvesting machine, identifying its main elements.

The particular embodiments of the invention are described herein with reference to the appended figures. These figures are schematic and their sizes and/or proportions may not correspond to reality, given that they aim at describing the invention in a didactic manner. Moreover, certain known and common constructive details may have been omitted for greater clarity and conciseness of the description which follows. The used reference numerals are repeated throughout the figures to identify identical or similar parts. Possibly used terms as "above", "below", "front", "rear", "right", "left", etc. and their variations must be construed according to the guidance provided in FIG. 1.

FIG. 1 shows a schematic representation of an agricultural machine (A) of the sugarcane harvester type. Although the present specification relates to a sugar cane harvester, it is clear that the machine may also be employed for the harvesting of other tall stem plants such as sorghum. A harvesting machine (A) may be, for instance, a machine known in the state of the art, made available by CNH Industrial N.V. marketed under the trademark Case IH.

The harvesting machine (A) substantially comprises a chassis (E) mounted on conveyor belts (R) or wheels, a drive motor (M), an operation and control cabin (C), a primary cleaning extractor system (L1), a billet elevator (T) with secondary cleaning extractor system (L2) transferring the billets to, for instance, an overboard or prilling bucket (not shown). Furthermore, the harvesting machine (A) is designed to receive a header (P) through the structural assembly set, object of the present invention. As mentioned above, and merely by way of reference, a suitable harvesting machine, including its constructive details, is disclosed in US 2014/0174048, incorporated herein by reference.

The machine (A) moves along the ground in a harvesting direction, represented by the arrow (S) in FIG. 1, towards one or more rows of plants planted at regular spacings (not shown).

Figure 2:
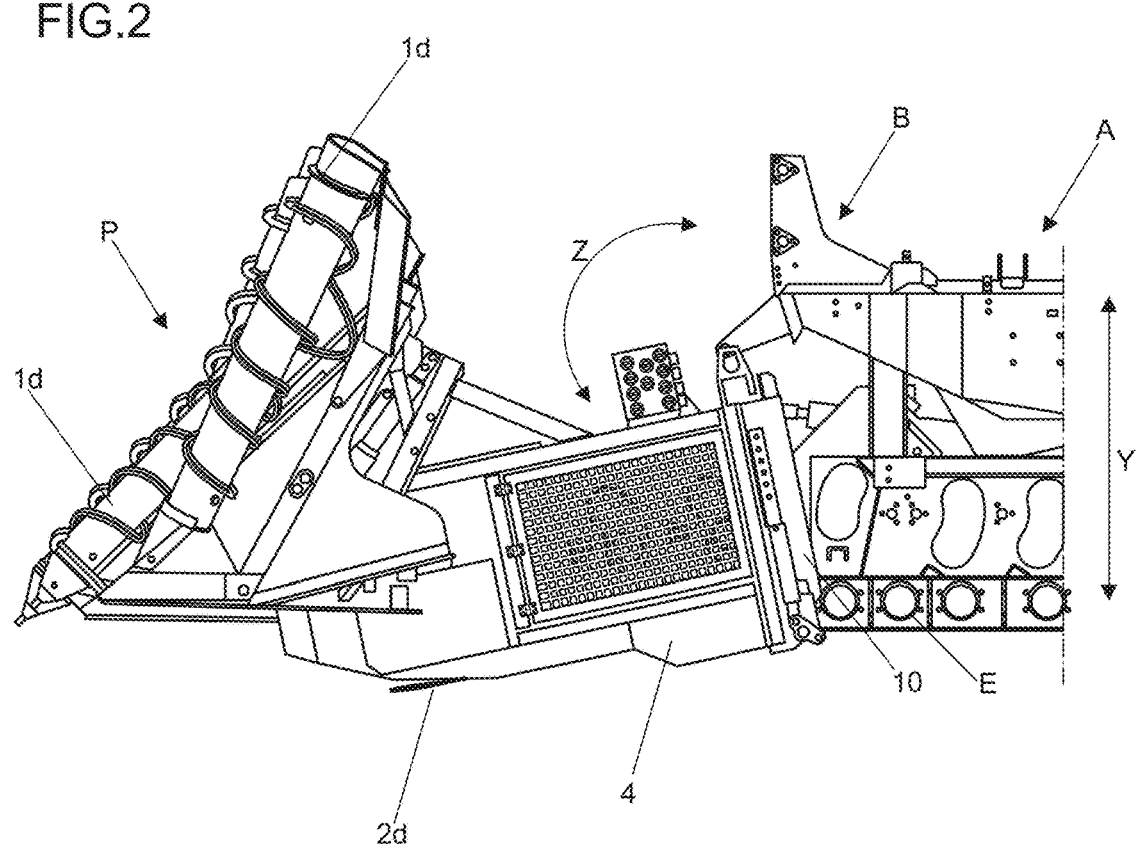
FIG. 2 shows a side view of a header for agricultural machines with their basic cutting elements mounted on the structural set, according to the present invention.
Figure 3:
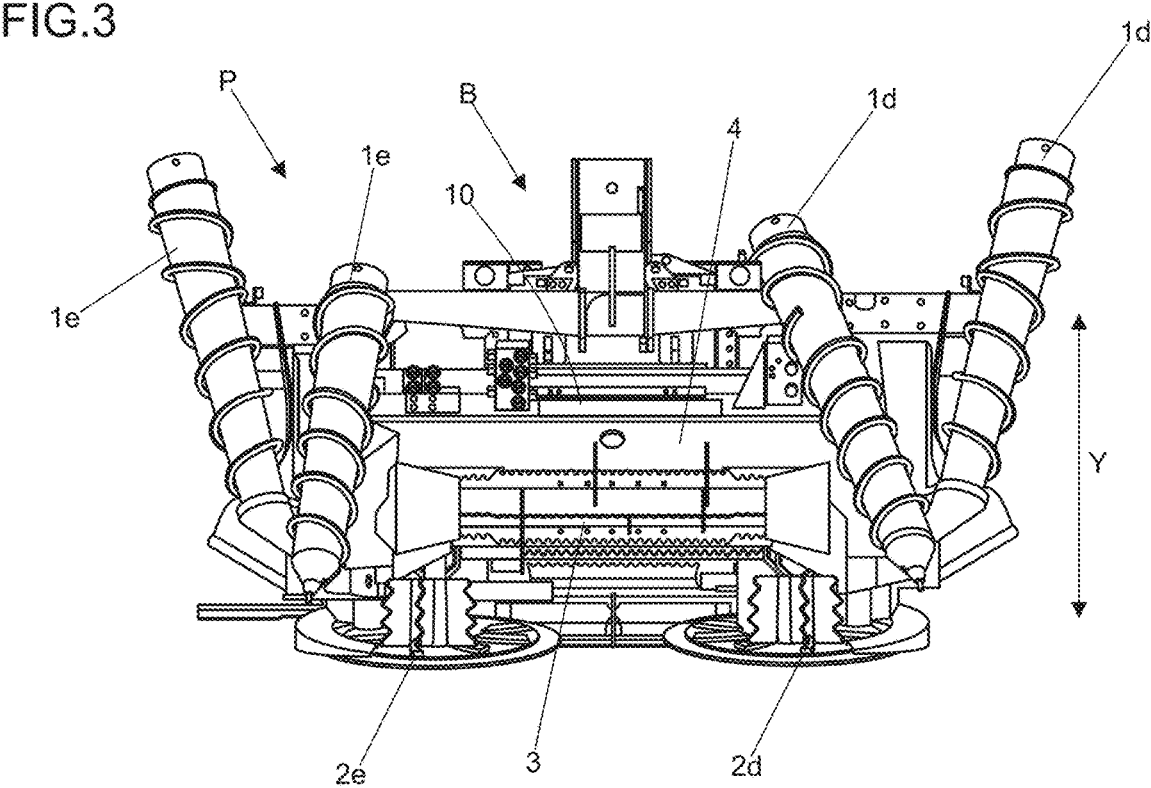
FIG. 3 shows a front view of the header shown in FIG. 2 mounted to the structural set, according to the present invention.

With reference now to FIGS. 2 and 3, the header (P) can be seen in more detail with a schematic representation of some of its elements, such as the row dividers 1d, 1e, base cutting discs 2d, 2e, which are embedded or incorporated in the structure 4 of the header (P), which, in turn, is mounted on the structural set 10, according to the present invention.

Some models of sugar cane harvesters comprise mechanisms capable of promoting the height adjustment of the machine, according to the illustrative arrow "Y". This adjustment is usually made in the chassis (E) of the machine by adjusting the height of the chassis relative to the wheels or conveyor belts (R). It is also possible to adjust the front tilt to suit the angle of attack of the base cutting discs 2d, 2e, as indicated by the illustrative arrow "Z", by way of a pivoting mechanism, for example.

Referring now to FIGS. 4A to 5B, the structural assembly set 10, object of the present invention, comprises girder 11 comprising a central beam 12 that interconnects the support columns 13, which are pivoted next to the chassis (E) of the agricultural machine (A) through fastening elements 14 provided at the base of the support columns 13. Such fastening elements are described more in-depth below with respect to FIGS. 6A to 6C.

Figure 4A:
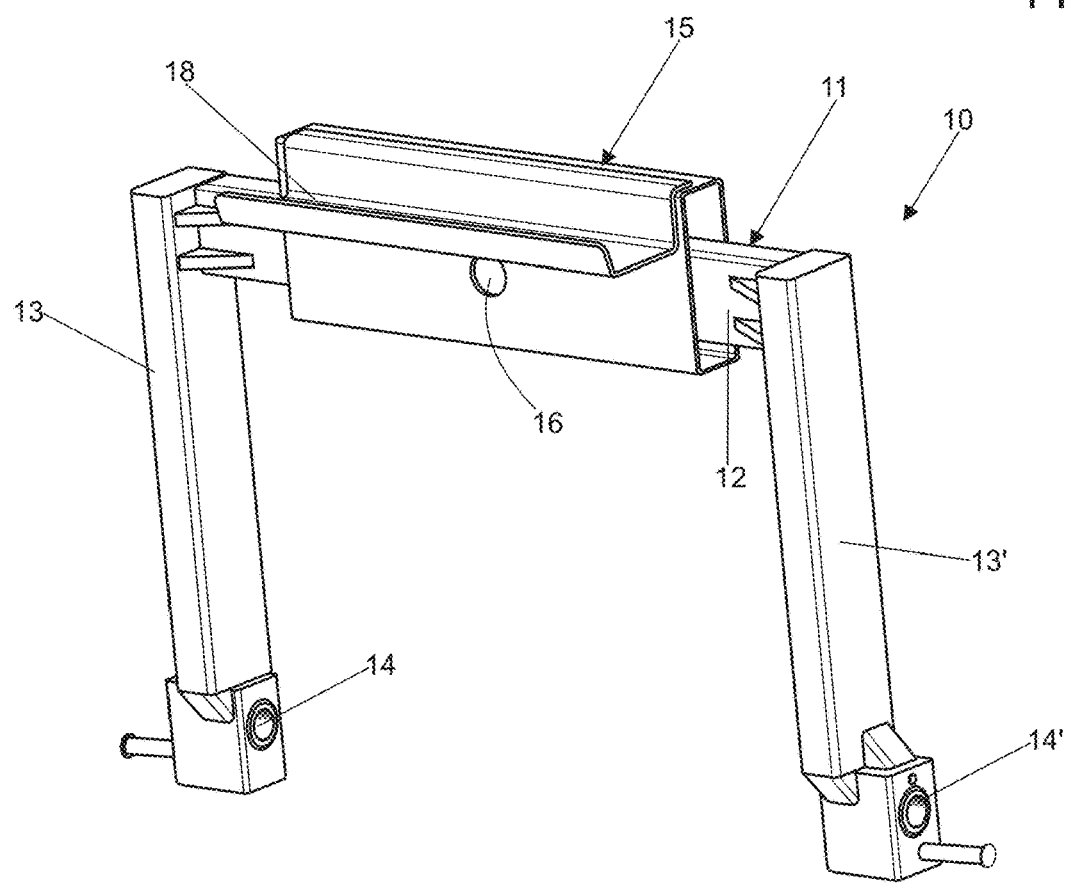
FIG. 4A is a perspective view of the structural set, in the rest position.
Figure 4B:
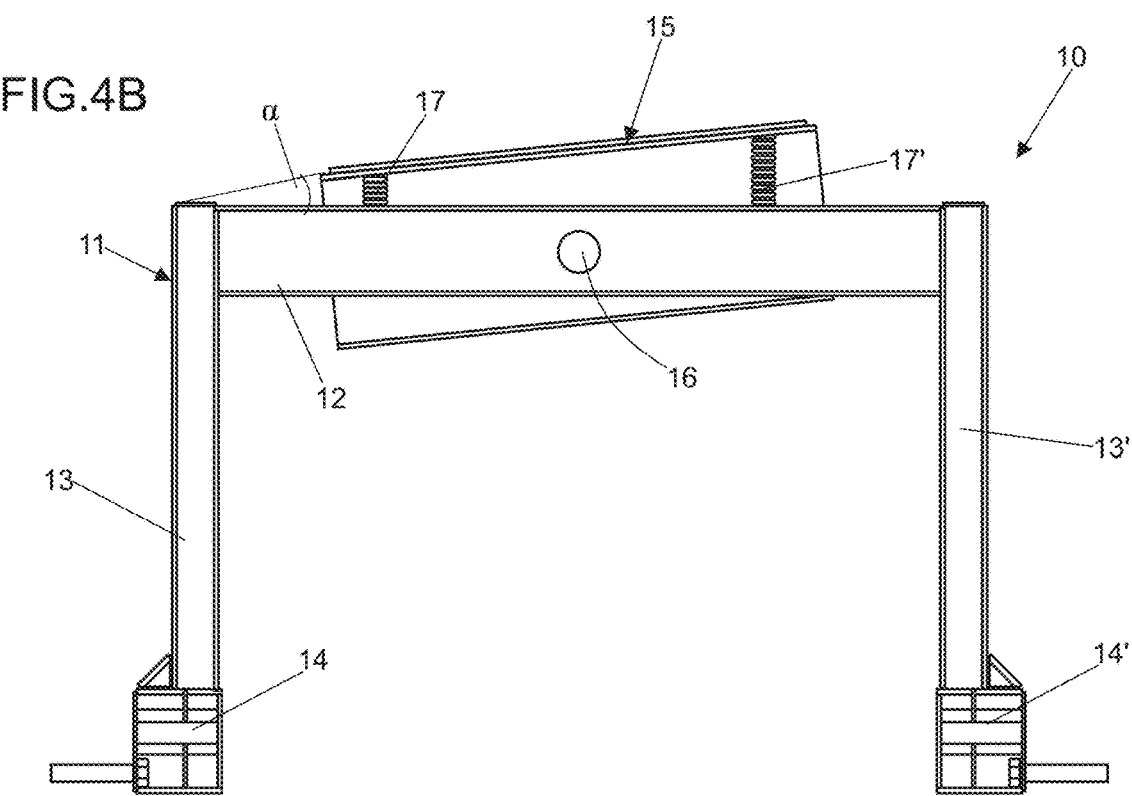
FIG. 4B is a rear view of the structural set of FIG. 4A in lateral compensation mode.

The central beam 12 is provided with a pivoting point 16, which can be an opening or pin for embedding and fastening a bracket 15, which comprises return elements 17 which may be anchored to the girder 11, as shown in FIGS. 4A and 4B. Such return elements 17, 17' may be, for example, springs which exert a spring force, either by stretching on one side and compression on the other, in the sense of stabilizing the central beam 12 in a substantially horizontal position, in which the return elements 17, 17' mutually compensate the force exerted by each one, and therefore it can be said that the horizontal position, as shown in FIG. 4A, is the rest position. Other return elements may of course be employed, such as, but not limited to, elastomeric materials, hydraulic cylinders, mechanical drives, such as pinion-worm, or any other equivalent means. Alternatively, according to more automated embodiments, the return elements may be of the hydraulic or electric type, with actuators controlled by a control center, for example, installed inside the control cabin (C) for proper adjustments of the operators.

As should be appreciated by those skilled in the art, on the one hand, the pivoting point 16 allows the bracket 15 to make a partial rotation, clockwise or counterclockwise, according to the compensation required by the sensitivity of the header to the ground as the machine moves along the planting rows in the harvesting direction (S). On the other hand, and in order to ensure the repositioning of the bracket 15, the return elements 17 are arranged in a condition in which the rest state places the bracket in the neutral position, that is, in the position in which the header is horizontally aligned.

As shown by FIGS. 4A and 4B, in an exemplary embodiment of the present invention, the return elements 17 are helical springs and are fastened within the bracket 15 and anchored to the central beam 12 of the girder 11. Preferably, these return elements 17 also form a bearing or wedge to assist mounting of the bracket 15 at the pivoting point 16.

Figure 5A:
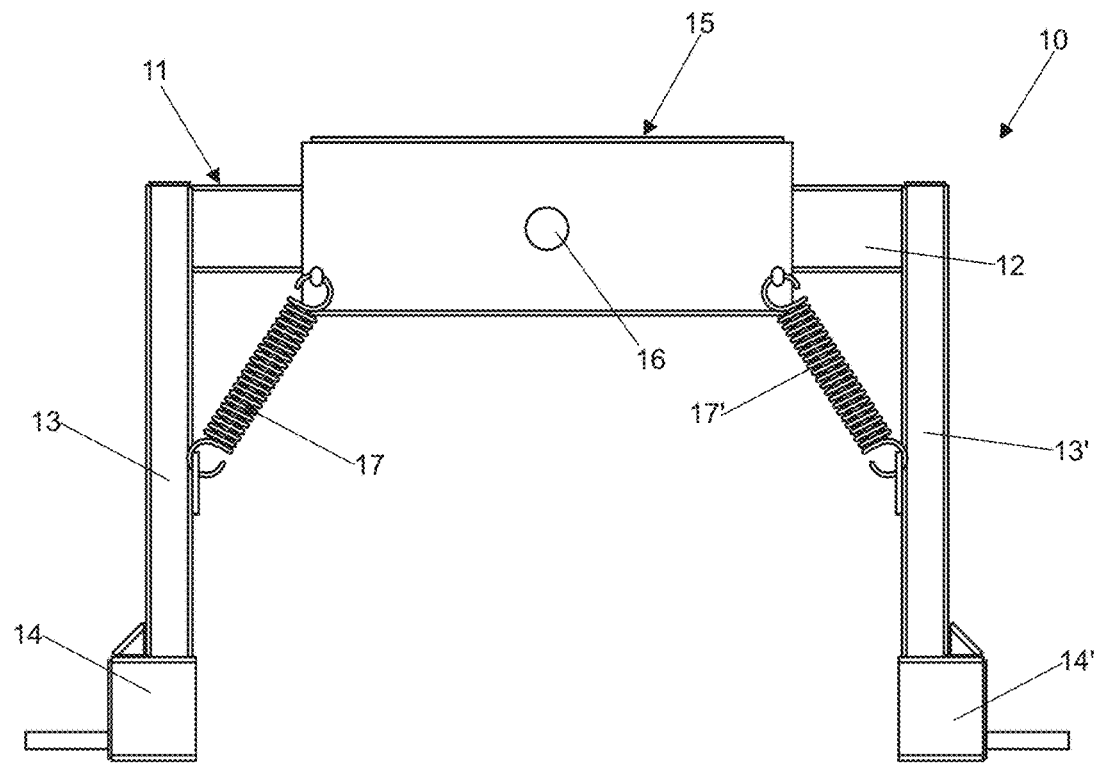
FIG. 5A is a front view of an alternative embodiment of the structural set of the invention in the rest position.
Figure 5B:
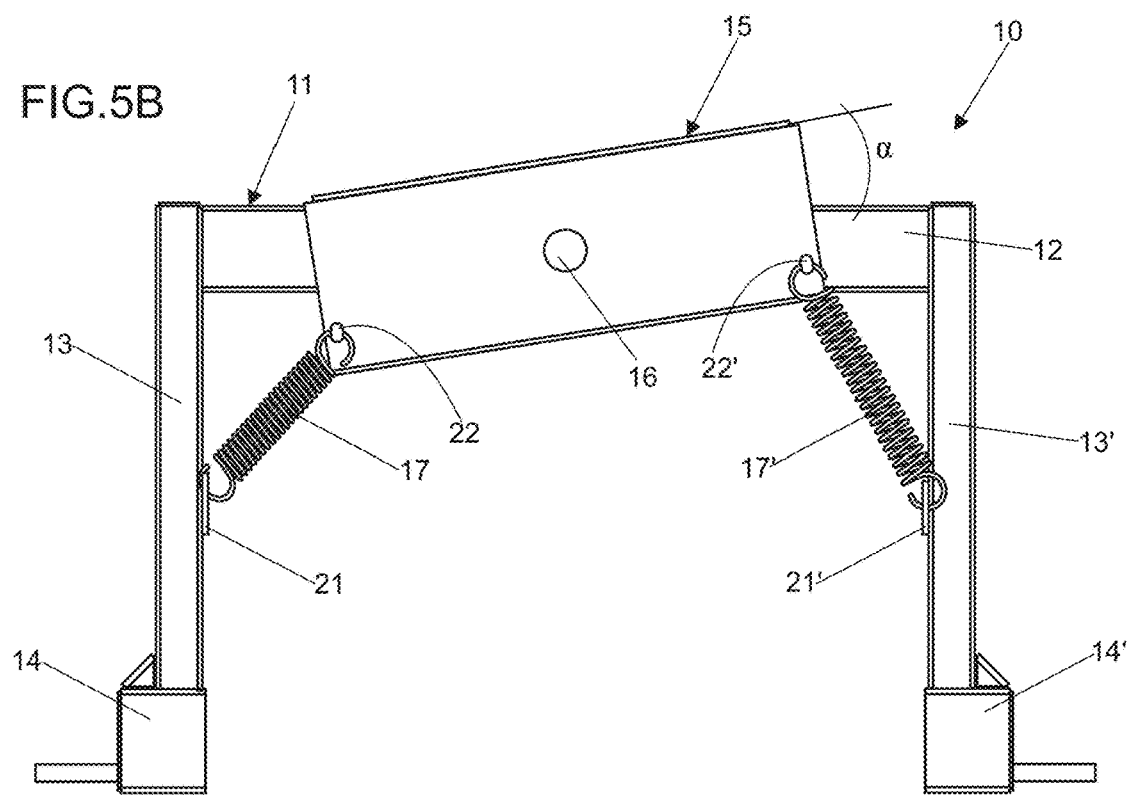
FIG. 5B shows the structural set of FIG. 5A in lateral compensation mode.

FIGS. 5A and 5B show an alternative embodiment of the invention, wherein the return elements 17, 17' are fastened to the outer surface of the bracket 15 and anchored to the support columns 13. If the return elements are helical springs, like the embodiment shown in FIGS. 5A and 5B, the bracket 15 may comprise hooks 22, 22' suitable for engagement and support of the springs, as well as the columns 13, 13' may also comprise fastening elements 21, 21' for embedding and fastening the other end of the springs.

As appreciated by those skilled in the art, the return elements 17 ensure repositioning and also the partial rotation of the bracket 15 at an angle (α). Such an angle (α) may be up to about 15° C. or more, and preferably may be about 5°, which is sufficient to obtain practical results in the field.

According to one embodiment of the present invention, the bracket 15 comprises a rail 18 for the engagement of structure 4 of the header (P). The bracket 15 may of course assume any technically possible configuration so that the header (P), and particularly the upper portion of the header, is embedded in and/or supported on and/or fastened to the bracket, provided that the bracket 15 has a pivoting characteristic along the pivot pointing 16. Accordingly, the pivoting point 16 may be any technically suitable means making the bracket pivotable about the point and, like the embodiment shown in FIGS. 4A to 5B, the pivot point may comprise a hole and a pipe formed in the bracket 15 and the beam 12 which engage and cooperate to allow the technical effect to enable rotation or pivoting about the point 16. Point 16 must of course, preferably, be provided in the central portion of the beam 12. In order to ensure secure locking of the header and particularly the rear upper part of the header in the bracket 15 of the present structural assembly set 10, it is possible to use complementary fastening elements, for example screws, nuts, fastening pins etc.

Furthermore, according to one embodiment of the present invention, the structure 4 of the header (P), at its lower rear side, can be locked in the structural assembly set 10 through the fastening elements 14, 14'.

Figure 6A:
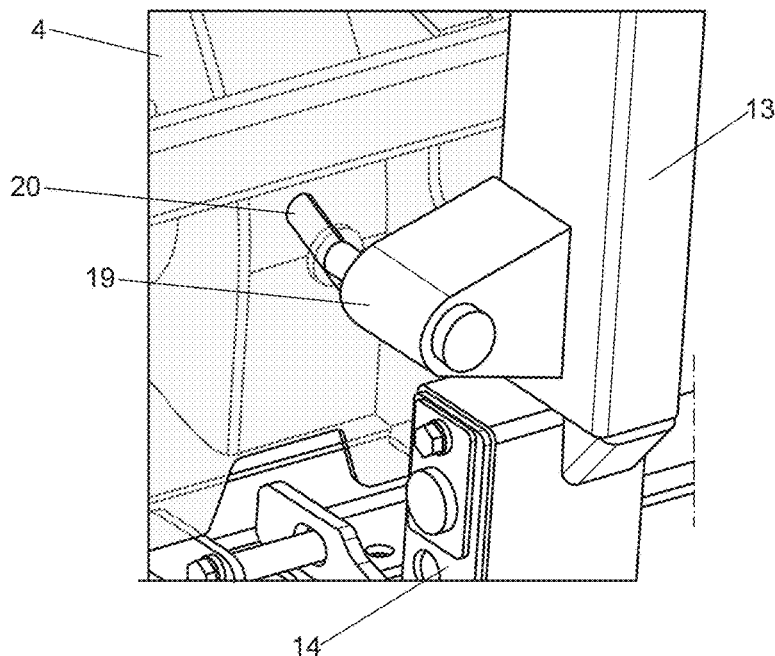
FIGS. 6A, 6B and 6C show details of one embodiment of the mode of fastening and locking of the header in the structural assembly set, according to the present invention.
Figures 6B, 6C:
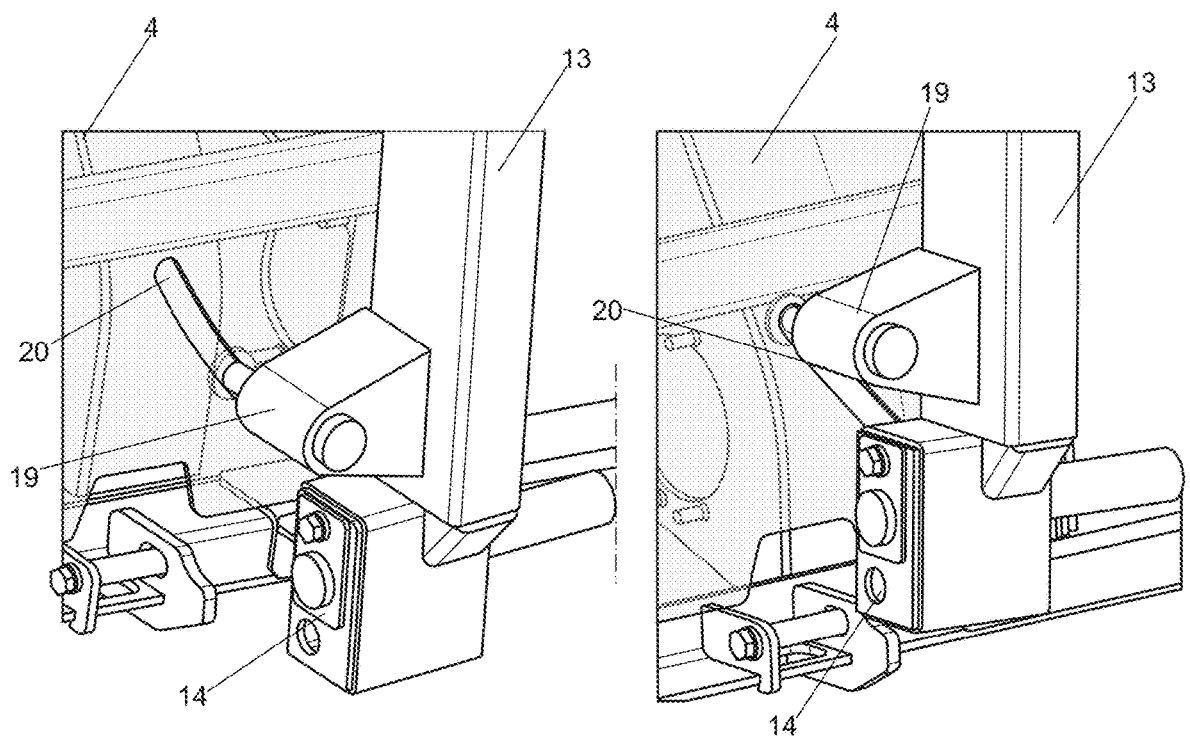

FIGS. 6A a 6C disclose an embodiment of the securing elements 14 and how they are secured to the structure 4 of the header (P). Generally, these fastening elements 14, 14' comprise at least one guide pin 19 disposed on at least one of the support columns 13, which passes through a guide groove 20 provided in the back plate of the structure 4 of the header (P). As appreciated by those skilled in the art, according to a more secure embodiment, the two support columns 13 comprise guide pins 19, which pass through guide grooves 20 provided on the back plate of the structure 4 of the header (P).

In further embodiments of the invention, in order to aid lateral compensation during movement of the machine along the planting rows, the structure 4 of the header (P) may comprise sensors, auxiliary wheels or any other equivalent structure capable of mapping the ground and the unevenness of the terrain between the planting rows being harvested. These sensors, auxiliary wheels etc. can be arranged in the skids of the row dividers 1d, 1e, since they are usually the first elements to detect ground irregularities.

The present invention further relates to a harvesting machine, such as the machine (A) for harvesting tall stalk plants, which is designed to comprise a structural set 10, object the present invention, intended for the assembly and fastening of a header (P), which comprises a structure 4 on which the basic front cutting elements are mounted, such as the row dividers 1d, 1e, sets of base cutting discs 2d, 2e and the knock-down roller 3. A suitable header for harvesting tall stalk plants, to be fastened to the structural set of the invention is described, for example, in BR 10 2015 0159226, by CNH Industrial Latin America Ltd., incorporated herein by reference.

According to a particular embodiment of the present invention, the harvesting machine (A) is intended for sugarcane and/or sweet sorghum harvesting.

Considering all of the above, the structural set 10 for assembling the headers (P) on the harvesting machines (A), as defined by the present invention, allows to obtain agricultural equipment of high productivity, since it is possible to overcome the inconveniences caused by the unevenness between the planting rows through the lateral compensation of the cutting elements and, with this, to obtain the appropriate cutting of the base of the plants, close to the ground, reducing the risks of losses of harvesting material.

The purpose of the present disclosure is merely to set forth and define in an exemplary manner possible and preferred embodiments of the structural set for lateral compensation of agricultural machine headers in accordance with the present invention. Therefore, as will be clear to those skilled in the art, numerous modifications and adaptations of elements and equivalent technical/construction details are possible without thereby departing from the scope of protection delimited by the appended claims.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A structural set for a header assembly, comprising:
at least two structural columns;
a bracket comprising at least one return element for returning the bracket to a substantially horizontal position when at rest; and
a girder comprising a central beam interconnected to the at least two structural columns, the central beam having a pivoting point for engaging and fastening to the bracket,
wherein the at least one return element forms a bearing or wedge to assist mounting of the bracket at the pivoting point.

2. The structural set according to claim 1, wherein the at least one return element comprises two return elements.

3. The structural set according to claim 1, wherein the at least one return element is, on one side, fastened to the bracket and, on another side, fastened to the central beam.

4. The structural set according to claim 1, wherein the at least one return element is, on one side, fastened to the bracket and, on another side, fastened to at least one of at the least two structural columns.

5. The structural set according to claim 1, wherein the at least one return element is a spring, a shock absorber, a hydraulic mechanism, or an electrical mechanism.

6. The structural set according to claim 1, wherein the at least one return element is at least one helical spring fastened to the bracket and anchored on the central beam of the girder.

7. The structural set according to claim 1, wherein the at least one return element is at least one helical spring fastened to an outer surface of the bracket and anchored to one of the at least two structural columns.

8. The structural set according to claim 1, wherein the bracket provides lateral compensation which comprises a partial rotation of the bracket about the pivoting point at an angle ($\alpha$) of up to 15°.

9. The structural set according to claim 8, wherein the angle ($\alpha$) is up to 5°.

10. The structural set according to claim 1, wherein the bracket further comprises a rail for engaging an upper portion of a structure of a header.

11. The structural set according to claim 10, wherein the structure of the header is locked in the rail using fastening pins or screws.

12. The structural set according to claim 10, wherein the structure is locked through a configuration comprising at least one guide pin disposed on at least one of the structural columns, which passes through a guide groove provided in a back plate of the structure of the header.

13. The structural set according to claim 12, wherein the at least two structural columns comprise guide pins, which pass through guide grooves arranged on a back plate of the structure of the header.

14. The structural set according to claim 10, wherein the structure of the header includes structure capable of mapping terrain unevenness between planting rows.

15. The structural set according to claim 14, wherein the structure capable of mapping the terrain is arranged on skids of row dividers mounted on the header.

16. A harvesting machine for tall stem plant harvesting, the harvesting machine comprising:
   a chassis assembled on tracks or wheels;
   a drive motor;
   a cabin for operation and control;
   primary and secondary cleaning extractor systems;
   a billet elevator;
   a header; and
   a structural set for the header, the structural set including:
      at least two structural columns;
      a bracket comprising at least one return element for returning the bracket to a substantially horizontal position when at rest; and
      a girder comprising a central beam interconnected to the at least two structural columns, the central beam having a pivoting point for engaging and fastening to the bracket,
      wherein the at least one return element forms a bearing or wedge to assist mounting of the bracket at the pivoting point.

17. The harvesting machine according to claim 16, wherein the machine is adapted for sugarcane or sweet sorghum harvesting.

* * * * *